H. E. VAN NESS.
DROP STEERING WHEEL FOR AUTOMOBILES.
APPLICATION FILED MAY 4, 1916.
1,188,585.
Patented June 27, 1916.
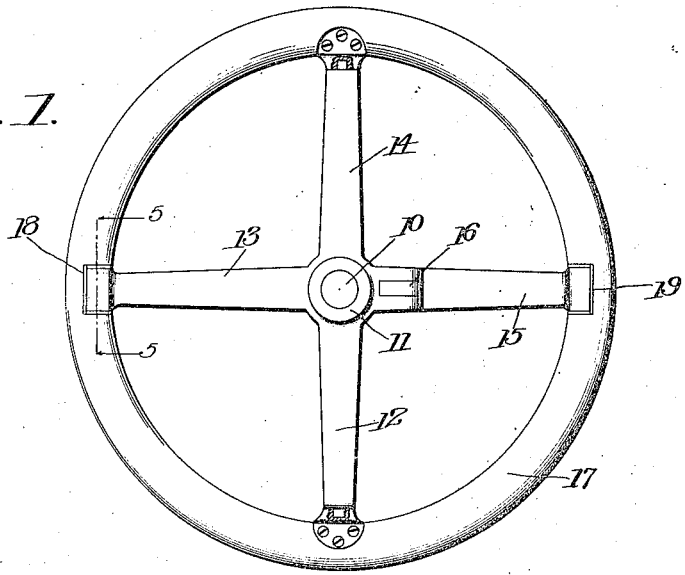
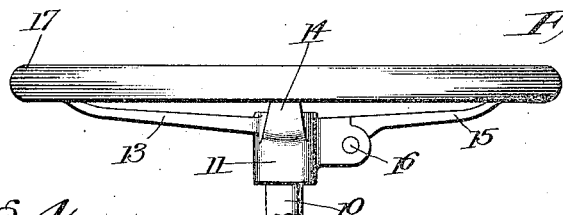
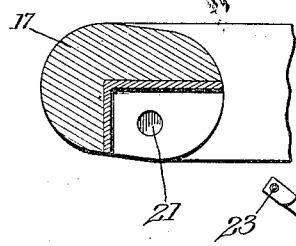
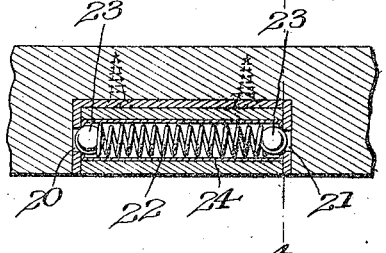
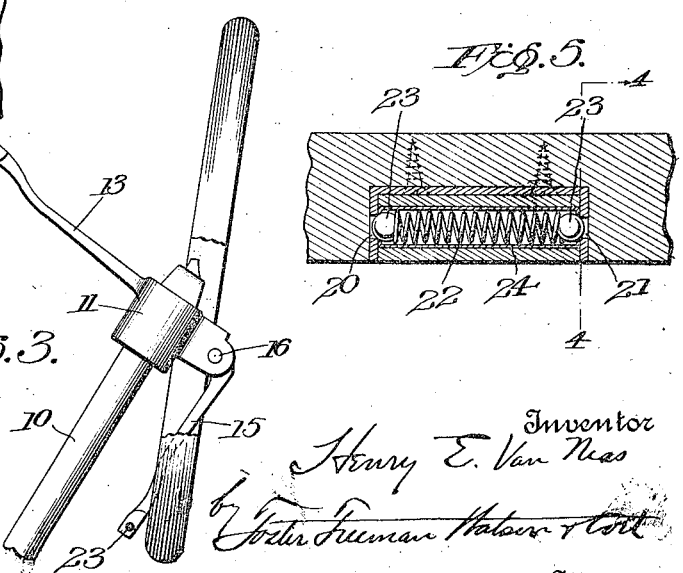
Witnesses
G. S. Baker
H. P. Jennings
Inventor
Henry E. Van Ness
by Foster Freeman Watson & ...
Attorneys

UNITED STATES PATENT OFFICE.

HENRY E. VAN NESS, OF ELMIRA, NEW YORK.

DROP STEERING-WHEEL FOR AUTOMOBILES.

1,188,585.  Specification of Letters Patent.  Patented June 27, 1916.

Application filed May 4, 1916. Serial No. 95,424.

*To all whom it may concern:*

Be it known that I, HENRY E. VAN NESS, a citizen of the United States, and resident of Elmira, Chemung county, State of New York, have invented certain new and useful Improvements in Drop Steering-Wheels for Automobiles, of which the following is a specification.

This invention relates to steering wheels, particularly to steering wheels which are designed to fold or drop in order to provide, when used in connection with automobiles, additional room between the wheel and seat, to enable the driver to more freely enter and leave his position.

It is the object of this invention to provide a wheel of this class which may be dropped quickly, which closely resembles the usual steering wheel in appearance, and which is of great simplicity and strength.

The invention will be fully disclosed in the following description, taken in connection with the accompanying drawings, in which:

Figure 1 is a bottom plan view of my improved wheel; Fig. 2 is a side view of the same; Fig. 3 is a side view of the wheel in its folded position, part being broken away; Fig. 4 is a section on the line 4—4 of Fig. 5; and Fig. 5 is a section on the line 5—5 of Fig. 1.

In the drawing, 10 indicates a steering column, having rigidly mounted thereon the hub 11 of a steering wheel, which has four spokes and resembles closely the usual steering wheel employed in automobiles. Three of the spokes 12, 13 and 14 are integral with the hub 11, while the other spoke, indicated by 15, is hinged to the hub at 16. The spokes are arranged at intervals of 90° around the hub so that they are in diametrically opposed pairs. Pivotally mounted on the outer ends of spokes 12 and 14, is the usual circular rim or handle 17 for manipulating the steering mechanism. This rim has two recesses 18 and 19 in its under portion, which recesses are adapted to receive with a close fit the outer ends of the spokes 13 and 15, respectively. The spoke 13 being rigid with the hub, acts as a stop to limit the rotation of the rim on its pivots in one direction and serves as a support for the side of the wheel when the wheel is in its normal operative position.

The hinged spoke 15 constitutes in reality a removable prop which, when in position with its end engaging the recess 19 in the rim, firmly supports the rim in its operative position. It is capable of being removed from this supporting position and swung downwardly on its hinge to allow the rim to be tilted or rotated about its pivots to assume the folded position shown in Fig. 3. The recesses 18 and 19 preferably extend about one-half way from the inner to the outer side of the rim and about one-half way from the bottom to the top, leaving the upper and outer surfaces of the rim continuous so as not to interfere with handling the same. The outer wall of the recess 19 serves as an abutment against which the outer end of the prop-like spoke 15 is adapted to bear to support the rim in its normal position. These recesses 18 and 19 are preferably metal lined in order that the rim, which may be of wood or composition, may not be worn in repeatedly changing the position of the wheel, and in the side portions of the metal lining are pairs of opposed circular holes 20 and 21, which constitute the socket members of a ball and socket latching means adapted to normally latch the ends of the spokes 13 and 15 within the recesses. In the ends of the opposed spokes 13 and 15 are transversely arranged hardened steel tubes 22. Each tube has within it at each end a steel ball 23 which normally projects for a short distance beyond the end of the sleeve, being retained by the ends of the tubes which are swaged inward. The balls are yieldingly maintained in these positions by coiled springs 24 located between them. In inserting the ends of the opposed spokes 13 and 15 into the recesses 18 and 19 the balls are forced inwardly by the sides of the recesses because of the close fit and snap into the holes 20 and 21 in the metal lining of the recesses, thus latching the spokes 13, 15 to the rim.

From the foregoing description the operation of the device will be apparent. Assuming the rim of the wheel to be in the position shown in Figs. 1 and 2, and that it is desired to lower or drop the rim, the first step taken is to lower or depress the outer end of the prop-like hinged spoke 15. The spoke is lowered or rotated about its hinge 16 until it occupies the position shown in Fig. 3. When the spoke 15 has been thus lowered the rim may be rotated on its axis to the folded position shown in Fig. 3 by merely applying sufficient pressure on the rim to disengage the latch between the spoke 13 and the recess 20. It will be noted that the pivot 16 is below and to one side of the line of the pivotal ends of the spokes 12, 14 which construction positively prevents the tilting of the rim unless the prop or hinged spoke be first disengaged and swung down.

Having thus described the invention, what is claimed and desired to be secured by Letters Patent is:

1. In a steering wheel, a steering column, a hub rigidly secured thereto, opposed spokes radiating from said hub, a rim pivotally mounted on two of said spokes, a stop adapted to limit the rotation of said rim on said pivots in one direction, and means for securing the rim in operative position comprising a spoke hinged to said hub and arranged to engage said rim on the side opposite said stop.

2. In a steering wheel, a steering column, a hub rigidly secured thereto, diametrically opposed spokes rigid with said hub, a rim pivotally mounted on said spokes, a stop adapted to limit the rotation of the rim on said pivots in one direction, and a spoke hinged to said hub and adapted to engage said rim to prevent its folding or to be disengaged from said rim to allow it to fold about said pivots.

3. In a steering wheel, a steering column, a hub rigidly secured thereto, opposed spokes rigid with said hub, a rim pivotally mounted on said spokes and having a recess therein, a stop adapted to limit the rotation of said rim on said pivots in one direction, and means for securing the rim in operative position comprising a spoke hinged to said hub, and arranged to engage the recess in said hub on the side opposite said stop.

4. In a steering column, a hub rigidly secured thereto, opposed spokes rigid with said hub, a rim pivotally mounted on said spokes and having a recess therein, a stop adapted to limit the rotation of said rim on said pivots in one direction, means for securing the rim in operative position, comprising a spoke hinged to said hub and arranged to engage the recess in said hub, said hinged spoke being adapted to be disengaged from said recess to allow the rotation of said rim about said pivots, in the other direction, and a spring latch adapted to latch said hinged spoke within said recess.

5. In a steering wheel, a steering column, a hub rigidly secured thereto, spokes rigid with said hub, a rim pivoted on two opposed spokes, a spoke hinged to said hub at a point below the plane of said wheel, its other end being adapted to normally engage said rim to support it in operative position.

In testimony whereof I affix my signature.

HENRY E. VAN NESS.